US010373751B2

(12) United States Patent
Bitetto

(10) Patent No.: US 10,373,751 B2
(45) Date of Patent: *Aug. 6, 2019

(54) ELECTROMAGNETIC SAFETY DEVICE

(71) Applicant: James J. Bitetto, Dix Hills, NY (US)

(72) Inventor: James J. Bitetto, Dix Hills, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/873,336

(22) Filed: Jan. 17, 2018

(65) Prior Publication Data

US 2018/0158585 A1 Jun. 7, 2018

Related U.S. Application Data

(63) Continuation of application No. 14/943,800, filed on Nov. 17, 2015, now Pat. No. 9,911,527.

(51) Int. Cl.

| | |
|---|---|
| ***H01F 13/00*** | (2006.01) |
| ***H01F 7/06*** | (2006.01) |
| ***F41H 11/00*** | (2006.01) |
| ***H01F 7/20*** | (2006.01) |
| *G01V 3/08* | (2006.01) |
| *F41H 13/00* | (2006.01) |

(52) U.S. Cl.

CPC ............ *H01F 7/064* (2013.01); *F41H 11/00* (2013.01); *H01F 7/20* (2013.01); *F41H 13/0018* (2013.01); *G01V 3/08* (2013.01)

(58) Field of Classification Search

None

See application file for complete search history.

(56) References Cited

U.S. PATENT DOCUMENTS 4,467,545 A * 8/1984 Shaw, Jr. ........... G07C 9/00158 42/70.01

9,911,527 B2 * 3/2018 Bitetto .................... H01F 7/064

* cited by examiner

*Primary Examiner* — Stephen W Jackson

(74) *Attorney, Agent, or Firm* — Tutunjian & Bitetto, P.C.; James J. Bitetto

(57) ABSTRACT

A safety system includes an electromagnet positioned in an area. A power controller is coupled to the electromagnet to supply power to the electromagnet in accordance with an event. A trigger mechanism configured to trigger the event when the area is traversed by a person with a weapon such that upon activation of the electromagnet a magnetic force is generated capable of attracting the weapon to make continued use difficult or impossible within the area.

20 Claims, 8 Drawing Sheets

ELECTROMAGNETIC SAFETY DEVICE

BACKGROUND

Technical Field

The present invention relates to electromagnetic devices, and more particularly to an electromagnetic device to protect against weapon violence.

Description of the Related Art

With the increase in weapon violence, many innocent people are left vulnerable to perpetrators until the police or authorities arrive. In many instances, arming innocent bystanders is not an option. For example, weapons in schools, carried by teachers or other public employees, may lead to other problems. Even with the availability of weapons, it is not always possible to stop armed perpetrators without causing collateral damage or putting innocent bystanders at risk.

SUMMARY

A safety system includes an electromagnet positioned in an area. A power controller is coupled to the electromagnet to supply power to the electromagnet in accordance with an event. A trigger mechanism configured to trigger the event when the area is traversed by a person with a weapon such that upon activation of the electromagnet a magnetic force is generated capable of attracting the weapon to make continued use difficult or impossible within the area.

A safety system includes an electromagnet positioned in an area; a power controller coupled to the electromagnet to supply power to the electromagnet in accordance with an event; and an identification system configured to receive feedback from one or more sensors in the area to determine whether an unauthorized weapon has entered the area and to trigger activation of the electromagnet through the power controller to generate a magnetic force capable of attracting the weapon to make continued use difficult or impossible within the area.

A method for disarming an individual includes monitoring an area to detect an individual carrying a weapon; activating a power controller coupled to an electromagnet to supply power to the electromagnet in the area in accordance with a trigger mechanism; and generating magnetic force in the electromagnet to attract the weapon to make continued use of the weapon difficult or impossible within the area.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Figure 1:
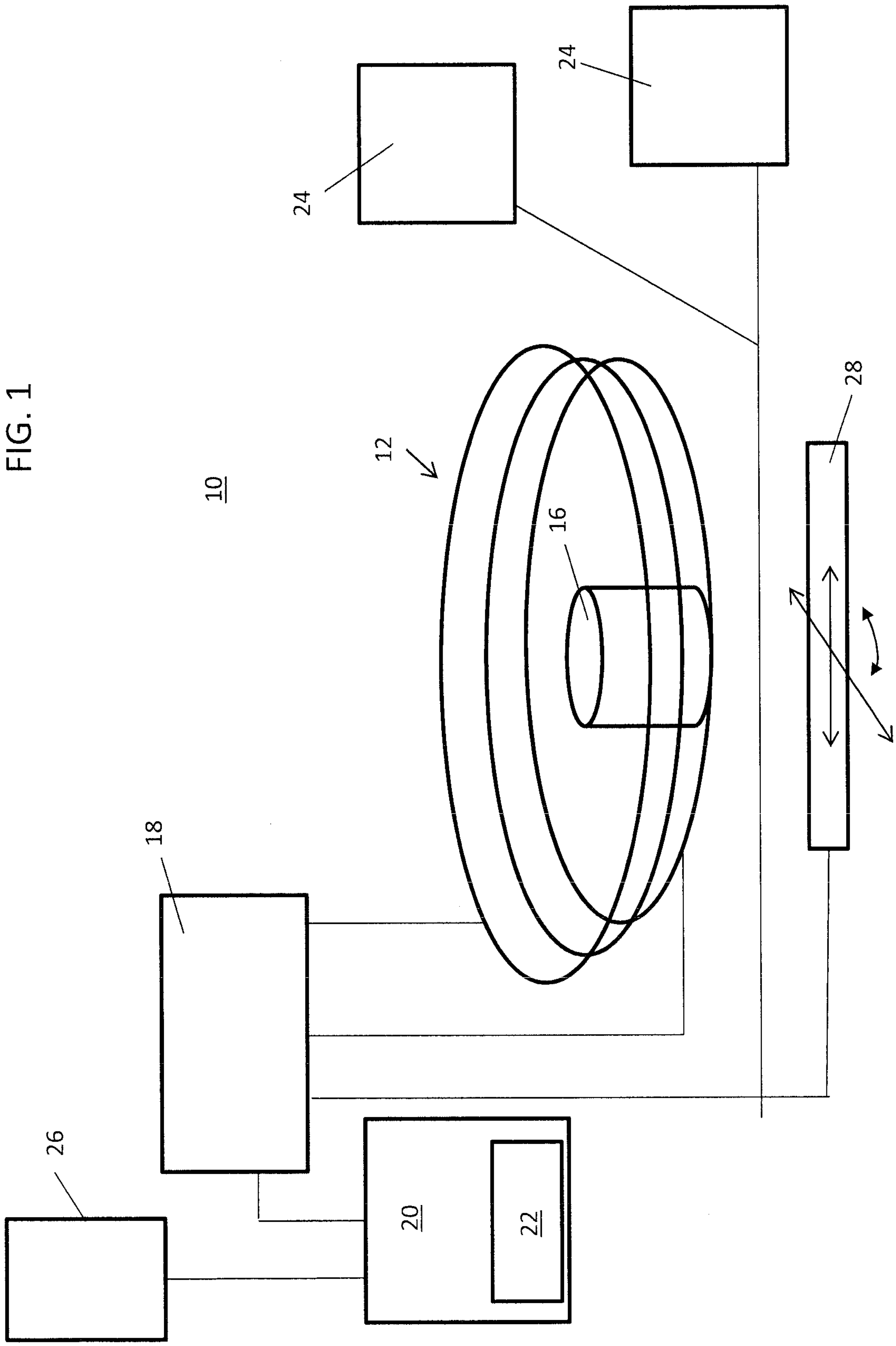
FIG. 1 is a schematic diagram showing a disarmament system in accordance with one embodiment in accordance with the present principles.

In accordance with the present principles, systems and methods are provided that can disarm an armed perpetrator. In one embodiment, an electromagnet is constructed within a wall or floor in a common area, classroom, entryway, etc. In the event of an attack by a gunmen or knife-wielding perpetrator, the electromagnet can be activated by those present in a room (or remotely) or automatically using sensors. The electromagnet will be energized and attractive forces on the weapon will draw the weapon to the electromagnet. The force generated by the electromagnet will pull the perpetrator's weapon toward the electromagnet and prevent further use of the weapon. In addition, if the perpetrator is carrying multiple weapons, the perpetrator may be drawn to the magnet as well and may be rendered incapacitated. The energizing of the magnet will provide a distraction and delay the actions of the perpetrator so that people nearby can take action of the police arrive.

In one embodiment, the electromagnet may be installed in a recessed space so that when the gun or other weapon is captured by the electromagnet, the recess prevents access or at least further discharge of the weapon. In one embodiment, a low electromagnetic field may be generated in a space. Upon entering the space with a large iron or steel weapon, sensors will activate the electromagnet to automatically energize and capture the weapon. In another embodiment, a trap door or grate may be located over the electromagnet. Upon energizing the electromagnet, the weapon or other object will hit the trap door and pass through the trap door and remain inaccessible to the perpetrator.

Areas that employ the electromagnet may need to be cleared of ferromagnetic materials. Persons may also need to be free of large metal objects. In accordance with the present principles, a counter action can be provided to disarm a perpetrator without the need of deadly force or weapons. The present principles remove the threat without risk to innocent bystanders. The deadly weapon is extracted without the use of potentially deadly force.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It will also be understood that when an element is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Referring now to the drawings in which like numerals represent the same or similar elements and initially to FIG. 1, a system 10 for protection against weapon violence is shown in accordance with illustrative embodiments. The system 10 includes an electromagnet 12 or may include a plurality of electromagnets. In its simplest form, the electromagnet 12 includes a winding or windings 14 (coil) that carry current about a central core 16. The core 16 is optional as the winding may be employed without a core. The core 16 may include a ferromagnetic material such as iron, steel although cobalt, nickel or other metals or combinations may be employed. The coil 14 is energized by a power regulator or controller 18, which may include AC power or DC power. The power regulator 18 may include a DC battery or batteries or may include a connection to a power grid (AC). In one embodiment, the power regulator 18 may draw energy from an independent source, as a security measure, in the event a perpetrator cuts the power to attempt to defeat the system 10.

The power regulator 18 controls power to the coil 14 and may include a trigger mechanism such as a switch 26 or be responsive to sensors 24. A controller 20 may be employed to activate the power regulator 18. Alternately, the switch 26 or the sensors 24 may activate the power regulator directly. The controller 20 may include a computer device or may include some form of processing capability. If the controller 20 is employed and includes a computer, the computer includes a processor and memory and may run software 22. Software 22 may work with sensors 24 to evaluate a risk represented by detecting a weapon or movement of a larger magnetic/metallic object.

The sensors 24 (and other described throughout this disclosure) may be adjusted for sensitivity. The sensors 24 may be responsive to larger pieces of metal but non-responsive to ordinary items, such as, belt buckles, watches, change, etc.

Weapons may include guns, knives, swords, chains, blunt objects, suicide vests, shrapnel, magazines, ammunition belts or any other magnetic object. Since many threats employ the use of iron or steel, the electromagnet 12 will be effective in attracting and removing the weapon from the perpetrator. Most weapons include materials that can be attracted to an electromagnet. The software 22 may include a determination of a shape of the object, the person carrying the object, the magnetic field changes caused by the object, etc. The system 10 may include a plurality of different sensors to evaluate a current situation. The sensors 24 may include cameras, metal detectors, magnetic field detectors, etc. The software 22 may be employed to identify a person with a face recognition application, identify a weapon with a similar recognition application and identify a weapon by a magnetic field profile or any other useful sensing device or operation. The software 22 may be employed to make smart decisions for activating the electromagnet 12.

In one embodiment, the switch 26 may be employed with or instead of sensors 24. The switch 26 may be employed as a panic button to activate the electromagnet 12 when danger is perceived or imminent. The switch 26 may be placed remotely from the location of the electromagnet 12 or may be placed nearby so a perpetrator is visible at the time of activation.

The electromagnet 12 can be sized to provide a sufficient attraction to remove the weapon of the perpetrator. The electromagnet 12 may be placed in a location where the perpetrator will need to pass, such as a doorway or hallway.

The electromagnet 12 can generate a force, which can be approximated as follows: $\text{Force}=((NI)^2\ kA)/(2\ g^2)$ (Eq. 1), where N=the number of turns, I=the current, in amperes (A), running through the turns, A=the cross-sectional area, in meters-squared, of the electromagnet 12, g=the distance, in meters, between the magnet and the piece of metal and $k=4\pi\times10^{-7}$ (constant). Assuming a gun is carried about one meter from the floor (g=1 m), the following estimate can be computed. For example, an electromagnet with 2,000 turns and a cross-sectional area of 0.25 meters-squared that is operated with 15 A of current at 1.0 meter from a piece of metal generates a force that acts on the piece of metal of about 318 lbs. Depending on the application and the positioning of the electromagnet 12, the force can be between 50 lbs. and 1500 lbs. or more. The attractive force can be generated to oscillate or vary so that accessories or even screws, buckles, bullets, etc. will be attracted to the electromagnet 12.

The electromagnet 12 may be mounted on a movable platform 28 that can be controlled by the controller 20 or guided in accordance with feedback from the sensors 24.

The platform 28 may include motors to move the electromagnet 12 in space in a number of different directions or rotations.

Figure 2:
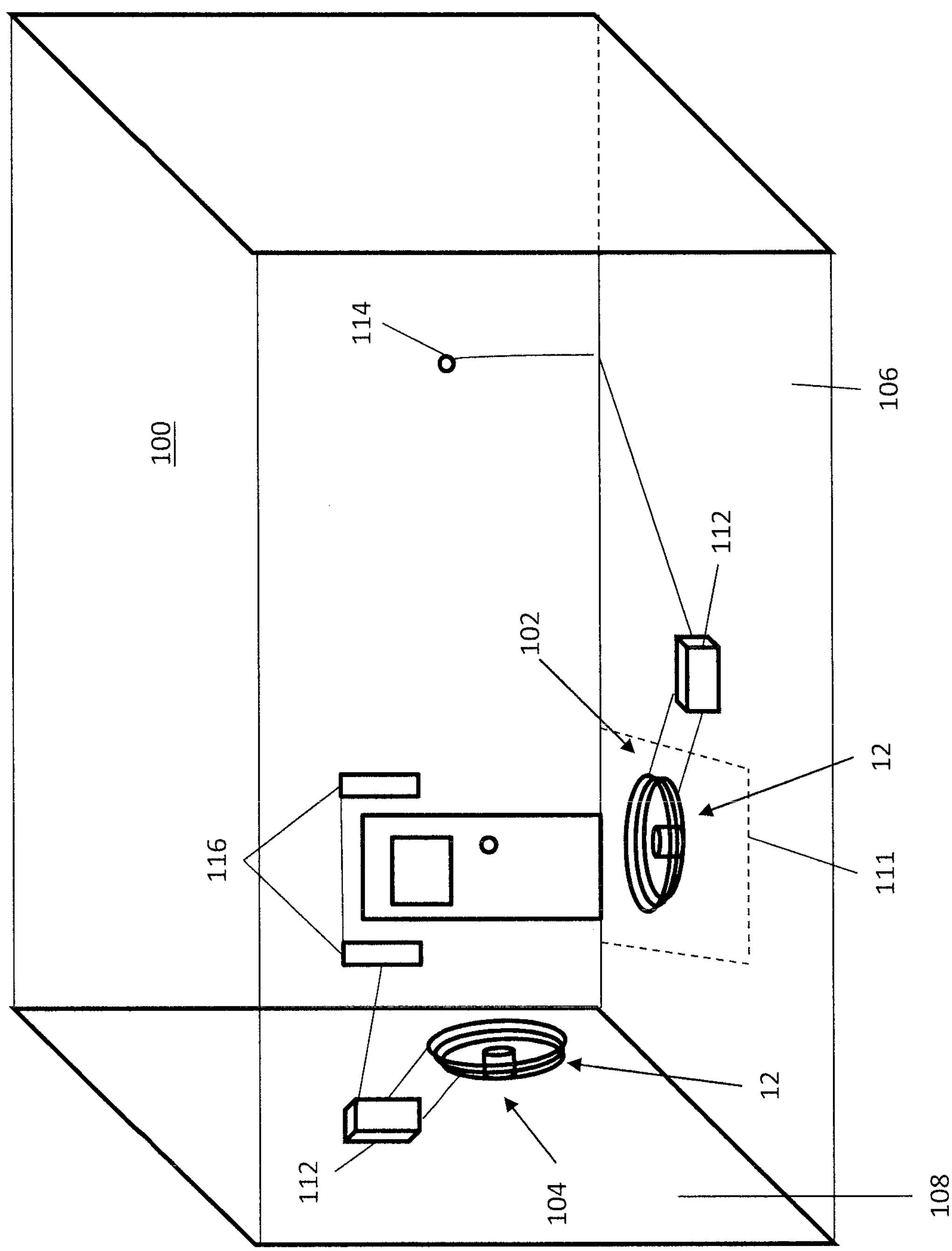
FIG. 2 is a schematic diagram showing two exemplary disarmament systems mounted in a room in accordance with the present principles.

Referring to FIG. 2, two illustrative configurations 102, 104 are depicted in an enclosed area or room 100 in accordance with the present principles. These configurations 102, 104 may be employed together or may be employed separately. Any number of configurations 102 and/or 104 may be installed together. Configuration 102 may be installed in a floor 106 below a floor covering or the like. The configuration 102 includes an electromagnet 12 firmly secured to joists, beams, slab, etc. such that any force generated by the electromagnet 12 will not move the electromagnet 12. A power controller 112 is also formed within the floor 106 (or other location). The configuration 104 includes an electromagnet 12 firmly secured to wall studs or wall materials such that any force generated by the electromagnet 12 will not move the electromagnet 12. A power controller 112 is also formed within the wall 108 (or other location).

In one embodiment, the enclosure 100 may include a classroom. If a school attack occurs with an armed perpetrator, occupants of the room 100 can hide near a switch 114. If the perpetrator enters the room 100 with a weapon, the switch 114 can be activated to turn on the controller 112, which in turn, activates the electromagnet 12 for configuration 102 (although configuration 104 may be activated as well or instead). Any iron or steel weapon that the perpetrator is carrying will be attracted to the electromagnet 12 in the floor 106 (or wall 108). The force of the electromagnet 12 on the weapon will be so great that the weapon and/or the perpetrator will be drawn to the floor 106. This will provide time to subdue the perpetrator, escape or delay activity of the perpetrator until help can arrive.

When the manual switch 114 is employed, it may be useful to include floor or wall markings 111 to indicate a danger area or area of highest potency for the electromagnet(s) 12. The markings 111 may be employed to time the activation of the switch 114 or deter entry by the perpetrator. The marking 11 may be apparent or may be hidden so that it will not be noticed by the perpetrator.

In another embodiment, sensors 116 may be placed at an entryway 110 into the room 100 for configuration 102 or 104. The sensors 116 may be metal detectors that can sense a large (or small depending on sensitivity) metal object entering the room 100. The sensors 116 may be activated using a switch or may be sensing at all times. If the perpetrator enters the room 100 with a weapon, the sensors 114 are stimulated to turn on the controller 112 of configuration 102 and/or 104, which in turn, activates the electromagnet(s) 12. Any iron or steel weapon that the perpetrator is carrying will be attracted to the electromagnet 12 in the floor 106 or wall 108. The force of the electromagnet 12 on the weapon will be so great that the weapon and/or the perpetrator will be drawn to the floor 106 or wall 108. This will provide time to subdue the perpetrator, escape or delay activity of the perpetrator until help can arrive.

Different coverings and mechanisms may be employed in accordance with the present principles to prevent the perpetrator from regaining access to the weapon or preventing the use of the weapon when captured or suspended by the electromagnet 12.

Figure 3:
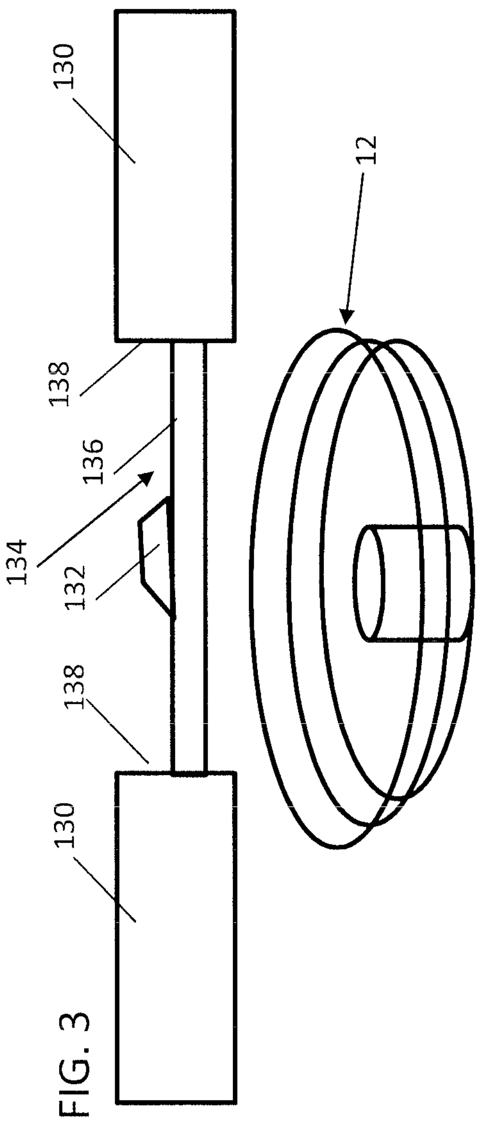
FIG. 3 is a schematic diagram showing a disarmament system with a recessed portion to prevent further use of a captured weapon in accordance with one embodiment in accordance with the present principles.

Referring to FIG. 3, the electromagnet 12 is placed behind a grate or platform 136. When activated, metallic objects, such as a weapon 132 are attracted by the electromagnet 12 and are captured in a recessed area 134. The recessed area 134 is disposed between portions 130 of a wall or floor area 130. If the weapon 132 is a gun, it will lay flat against the platform 136. If the gun is fired, the bullet will hit recessed sidewalls 138. Sidewalls 138 may include an absorber material so that the bullet is stopped. Once the rounds are exhausted reloading is impossible due to the electromagnet forces on either the gun (132) and/or any ammunition. If the weapon 132 is a knife, the knife will also lay flat and not be useful to a perpetrator.

Figure 4:
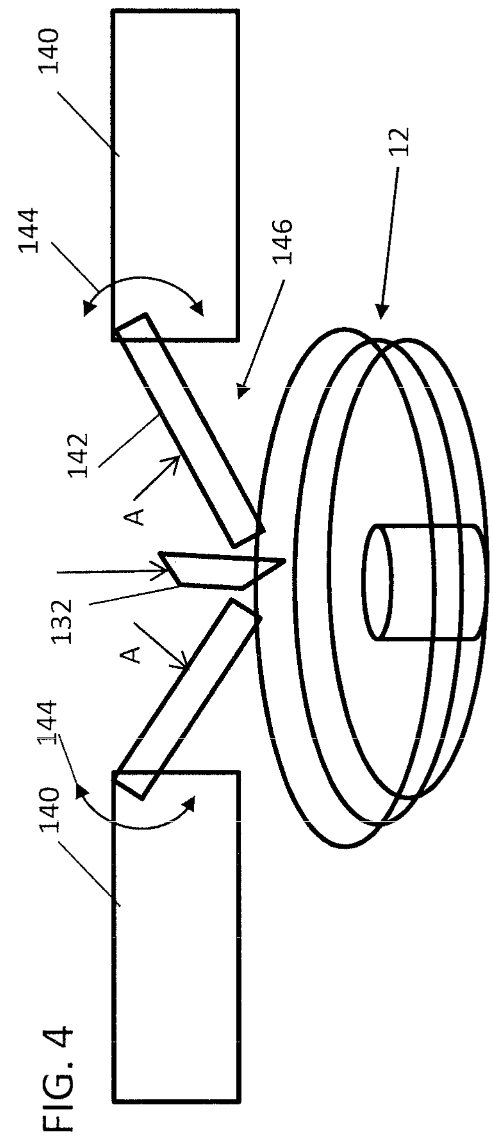
FIG. 4 is a schematic diagram showing a disarmament system with a trap door mechanism to prevent further access of a captured weapon in accordance with one embodiment in accordance with the present principles.

Referring to FIG. 4, the electromagnet 12 is placed behind a trap door or shutters 142. The trap door 142 is biased to a closed position by a spring force 144. The spring force may employ any suitable spring material including plastic or non-magnetic metals (e.g., aluminum leaf or coil springs, etc.). When activated, metallic objects, such as the weapon 132 are attracted by the electromagnet 12. The attractive force of the weapon 132 on the trap door 142 causes the trap door 142 to open and the weapon 132 to pass through. Once passed, the trap door 142 closes again to prevent any access to the weapon 132, which is now captured by the electromagnet 12, and if the electromagnet 12 is turned off, the weapon 132 is still captured by the trap door in a recessed area 146. The trap door 142 may be built flush with a wall, floor or ceiling 140.

Figure 5:
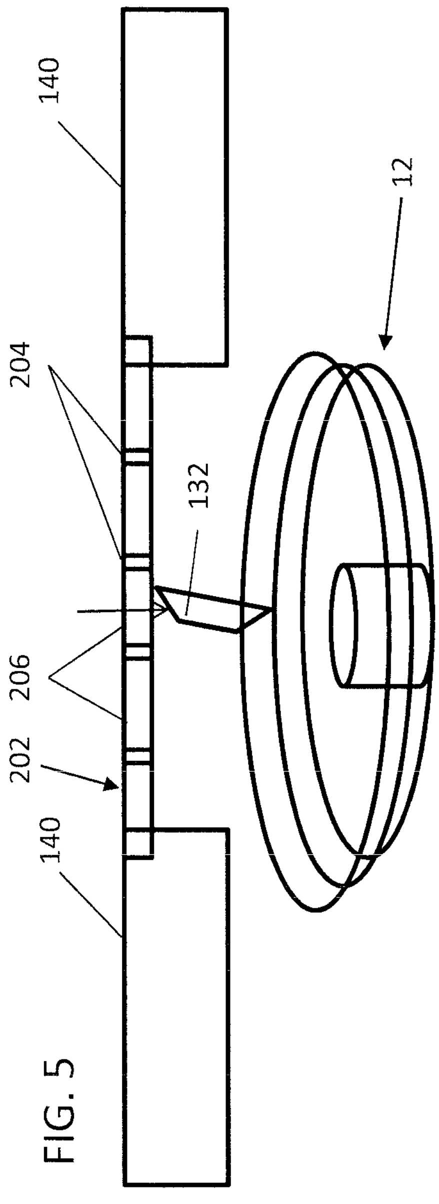
FIG. 5 is a schematic diagram showing a disarmament system with a grate to prevent further access of a captured weapon in accordance with one embodiment in accordance with the present principles.

Referring to FIG. 5, the electromagnet 12 is placed behind a grating 202. The grating 202 includes a grid of cross members 204 that may be rigid or may be flexible (e.g., a net). The cross members 204 may include plastic or other polymeric materials and can be configured in a honeycomb pattern, a web pattern, rectangular pattern, etc. The cross members 204 are spaced apart to form openings 206. The openings 206 may be of sufficient dimensions to permit a weapon or object 132 to pass through the grating 202 when the electromagnet is activated, or may stretch to permit the weapon 132 to pass through the grating 202. When the electromagnet 12 is activated, metallic objects, such as the weapon 132 are attracted by the electromagnet 12. The attractive force of the weapon 132 on the grating 202 moves the cross-members 204 aside or passes directly through the cross-members 204. Once passed the grating 202, the perpetrator is prevented from accessing the weapon 132 without great difficulty. The grating 202 may be built flush with a wall, floor or ceiling 140.

Figure 6:
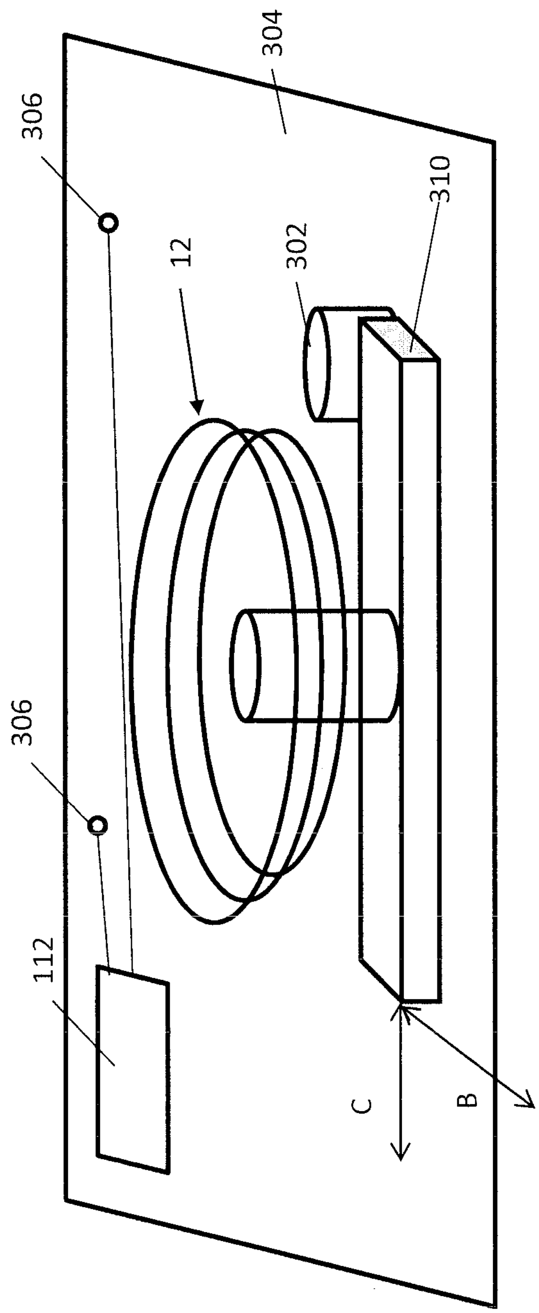
FIG. 6 is a schematic diagram showing a disarmament system mounted on a panel and permitting movement of the system relative to a platform in accordance with one embodiment in accordance with the present principles.

Referring to FIG. 6, electromagnets 12 can be made movable within walls ceilings or floors or may be mounted outside of walls, ceilings or floors. The electromagnetic 12 may be provided in panels or assemblies 304 to be mounted directly in walls, ceilings or floors. The electromagnet 12 may include a servo or motor 302 for moving the electromagnet 12 for adjustment in the direction of arrows B and/or C. In other embodiments, the electromagnets 12 may be moved perpendicular to the plane formed by arrows B and C or may be configured to rotate in any direction as needed to redirect the magnetic field. The panel 304 may include its own sensors to sense metallic objects in a vicinity, when activated. The panel 304 may work independently or may be employed as a part of a controlled or monitored security system. The panel 304 need not include the servo or motor 302 for movement.

A power controller 112 may be mounted in the panel 304 (or elsewhere) to control the electromagnet 12 (and/or the motor 302, if present). The motor 302 controls a rail or platform on which the electromagnet 12 is mounted. The panel 304 may be hidden in a wall or floor. Once activated, when a perpetrator moves passed the panel 304, sensors 306 detect a metal object and energize the electromagnet 12 to disarm or capture the perpetrator. The sensors 306 guide the movement of the electromagnet 12 to maximize attractive magnetic force. In one embodiment, the amount of current in the electromagnet 12 may be adjusted (automatically or be employing sensor feedback) to increase the magnetic field, if needed to draw the weapon closer.

Figure 7:
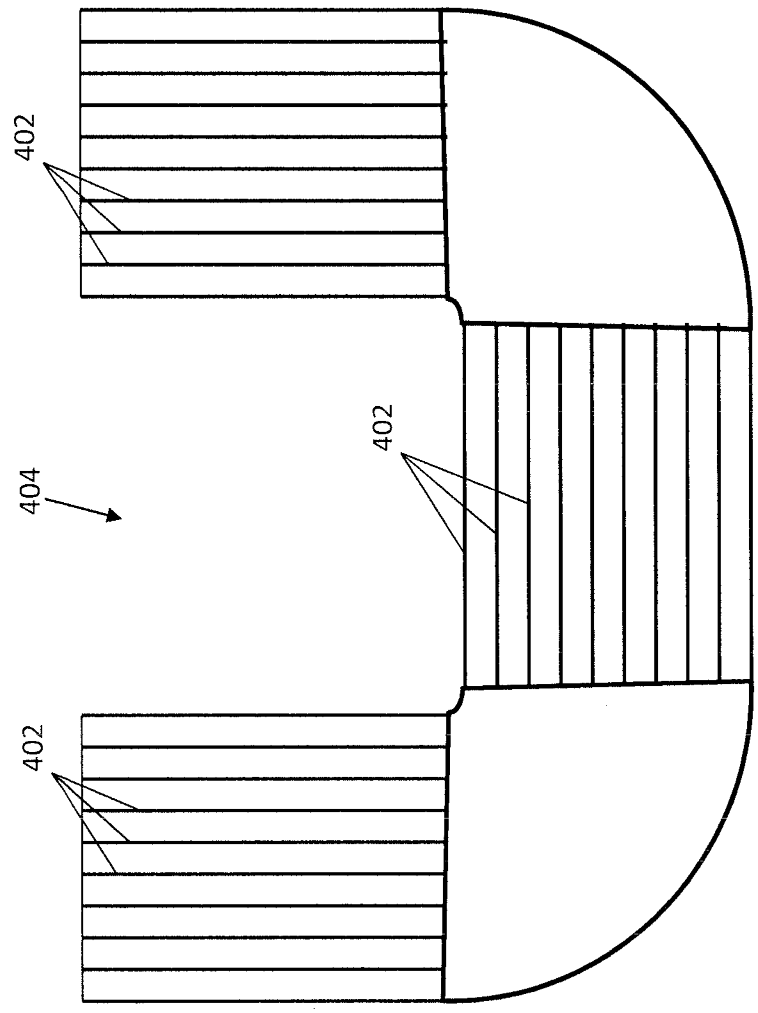
FIG. 7 is a side view of a disarmament system showing turns forming a U-shape to mount in a doorway or hallway in accordance with one embodiment in accordance with the present principles.

Referring to FIG. 7, electromagnets 12 may be formed into different shapes. In one example, an electromagnet 412 includes a u-shape 404 that can be installed along hallways, in doorways, in arches over doorways, etc. Windings 402 of the electromagnet 412 may be formed to direct a magnetic field as desired to have a greatest impact. Other shapes may include any closed loop configuration including circles, ovals, squares, rectangles, etc.

Figure 8:
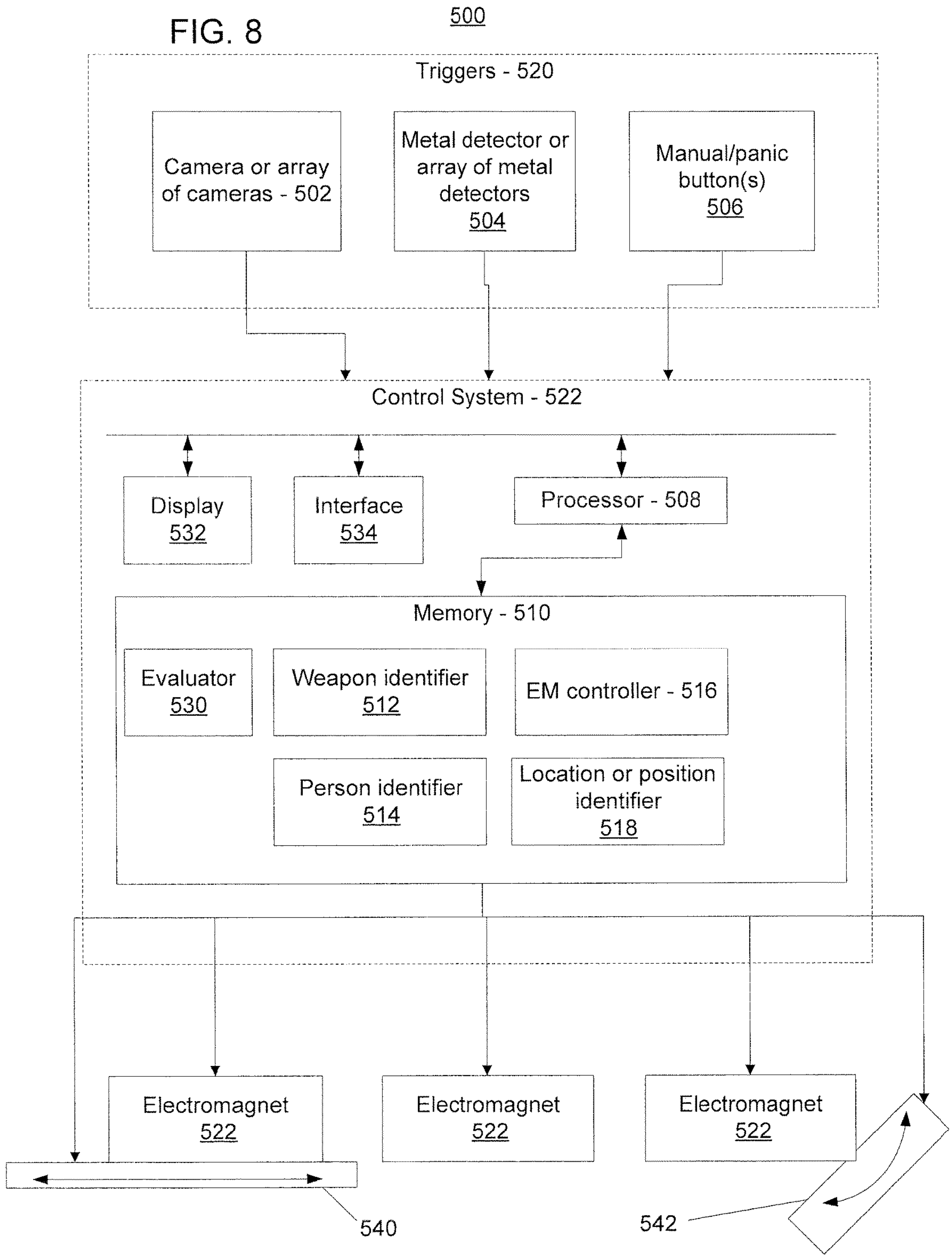
FIG. 8 is a block/flow diagram showing a security system for monitoring an area, identifying a weapon or person wielding a weapon and controlling the activation of one or more electromagnets in accordance with the present principles.

Referring to FIG. 8, a security system 500 includes a control system 522 for controlling the activation of one or more electromagnets 522 in accordance with the present principles. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The control system 522 includes one or more processors for carrying out computational and other processing operations. Memory 510 is coupled to the processor 510 and stores applications, which can be employed using an operating system. The memory 510 stores applications for monitoring security and reacting to a threat. System 500 may be employed as a part of a larger security system or may be employed independently.

In particularly useful embodiments, the memory 510 stores a weapon identifier application 512. The weapon identifier application 512 can work in conjunction with the camera(s) 502 and/or metal or field detector(s) 504 to determine whether a person is carrying a weapon. The weapon identifier 512 may include a database or store different weapon shapes for comparison against a detected metal object to decipher, using an evaluator 530, a likelihood that the object is a weapon. The weapon identifier application 512 can employ object recognition software for visual input (visual signature) to determine if a shape and size of an object make the object a potentially dangerous weapon. A magnetic signature of the weapon may also be collected to determine whether the object is magnetic and if so how much. In one embodiment, the system 500 may be employed to determine an authorized signature of an individual and/or a weapon. For example, an identity of a weapon carrier may be known to the system and approved without triggering the electromagnet, while an unidentified individual carrying a weapon may trigger the electromagnet. In one embodiment, the interface 534 may include microphone or the like to measure acoustic energy to determined, e.g., if a gun is being fired.

A person identifier application 514 may be employed to determine whether a person potentially carrying a weapon is authorized to do so. The person identifier application 514 may include face recognition software or may be responsive to items carried by the person. For example, a police officer or other security detail may carry an object that includes a particular magnetic signature or other identifying criteria so that the system 522 can determine whether the person is authorized to carry the weapon.

The different sensing data, from multiple sources, may be combined in the evaluator 530 and compared to a threshold to make a determination as to whether a dangerous event is occurring or is about to occur. For example, a large object may be seen by a camera 502, and sensed for magnetic properties by detector 504. For example, if the object is determined to be a weapon with a high likelihood, acoustic energy consistent with gun fire is determined, and the individual is not carrying an authorization object, the system 522 activates and controls one or more electromagnets 522. Each of these criteria may be scored and a total score may be computed to determine whether the electromagnets 522 should be activated. The score may be computed based on a formula with different weightings corresponding to the probable likelihoods that an input or set of inputs includes a dangerous situation that warrants the activation of the electromagnet(s).

The electromagnets 522 may be activated individually, in sets or all at once. A location or position identifier 518 may determine one or more places where a threat exists. This may be based on where the camera 502 or detector 504 are located, where acoustic energy is measured, where other sensors are activated, etc. Once it is determined that a threat exists and where is exists, an EM controller 516 is activated to energize the designated electromagnets 522. The electromagnets 522 may be moved using actuators, rails 540, gears, rotaries 542 or other motion devices to better position the electromagnets 522 to disarm the threat.

System 522 may react to manual controls 506, such as a panic button. The manual controls 506 may be configured to have priority over automatic controls.

System 522 may include a display 532 for viewing images generated by the cameras 502, display area maps, etc. for providing security monitoring. Display 532 may also permit a user to interact with the system 522 and its components and functions, or any other element within the system 500. This is further facilitated by an interface 534 which may include one or more of a keyboard, a microphone, a speaker, mouse, a joystick, a haptic device, or any other peripheral or control (and multiples of any or all of these) to permit user feedback from and interaction with the system 500.

Figure 10:
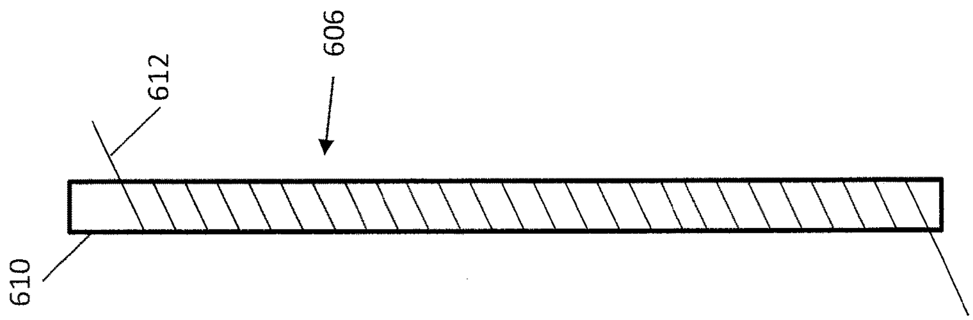
FIG. 10 is a diagram showing an electromagnet for mounting inside a cinder block wall or other type wall in accordance with the present principles.
Figure 9:
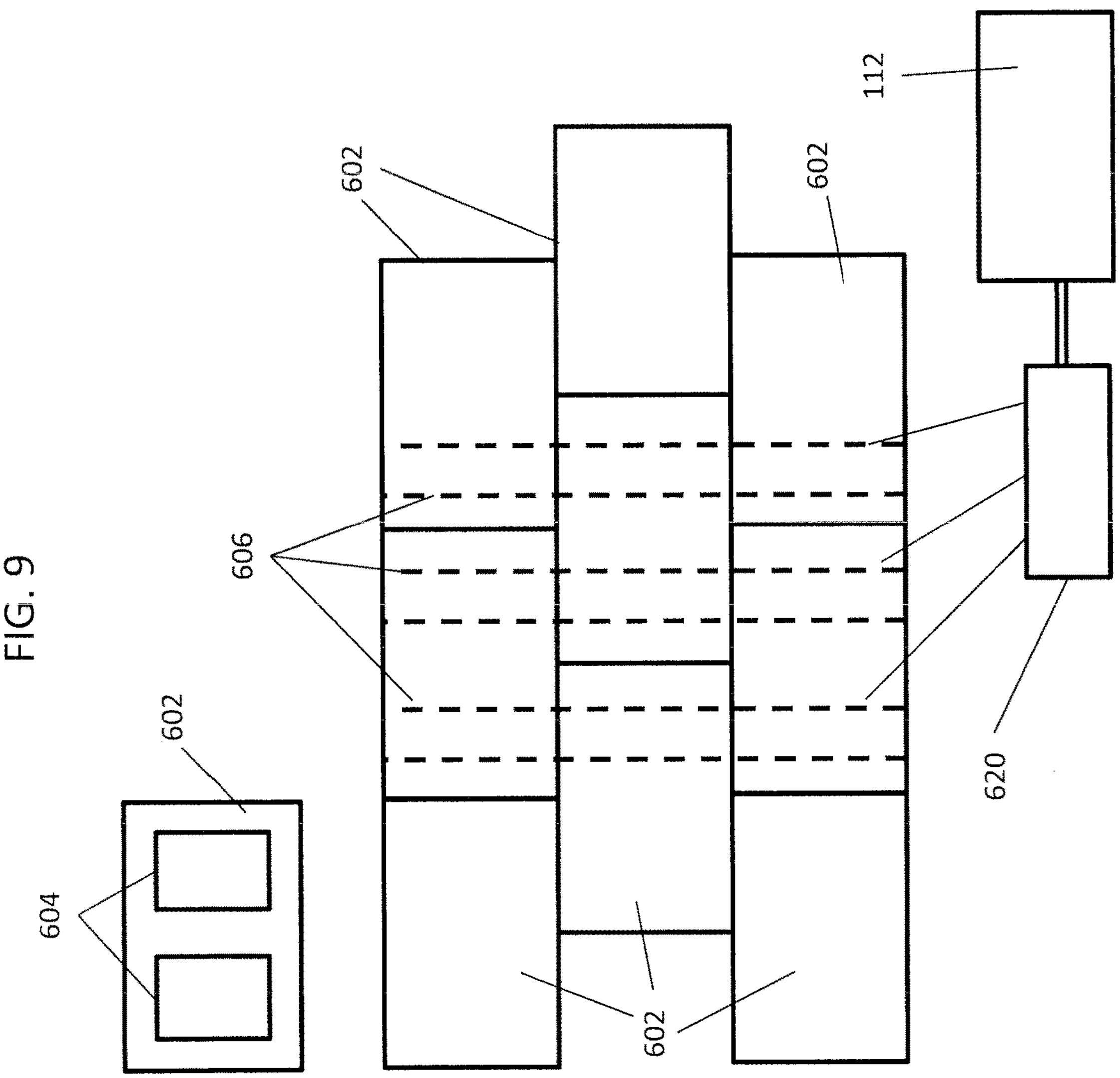
FIG. 9 is a schematic diagram showing electromagnets stowed inside a cinder block wall in accordance with the present principles.

Referring to FIGS. 9 and 10, different configurations may be employed for electromagnets. In one embodiment, an electromagnet 606 may be disposed within holes 604 within cinder blocks 606 or located in other wall types. Cinder blocks 606 are commonly employed in schools or public buildings. Cinder blocks 606 include holes 604 which can receive electromagnets 606 during construction or may be retrofitted if needed. Electromagnets 606 include a core or metal rod 610 and a winding or windings 612. The windings 612 may be connected to a current source, such as a battery or AC power when triggered to activate the electromagnets 606. In this embodiment, the electromagnet 606 may be hidden within the walls of a school or public building in many locations. The electromagnets 606 are economically feasible and may include a steel or iron core 610 and a copper winding 612.

The windings 612 may be routed to a central location which includes a controller or controllers 112 for providing power. In addition, the controller(s) 112 may be coupled to a switch 620, which is configured to activate one or more electromagnets 606. The electromagnets 606 may be activated individually or in sets in accordance with a sensor or camera or by any other trigger.

In another embodiment, the electromagnet 606 may be placed within any wall (e.g., residential, commercial, etc.). The electromagnet 606 may be placed along studs, joints, beams, etc.

Figure 11:
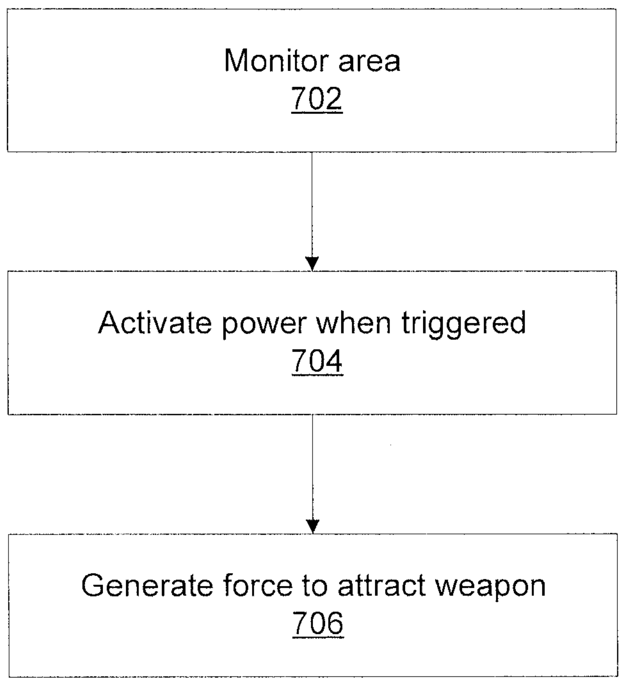
FIG. 11 is a block/flow diagram showing a method for securing an area in accordance with the present principles.

Referring to FIG. 11, a method for disarming an individual is shown in accordance with on embodiment. In block 702, an area is monitored to detect an individual carrying a weapon. The monitoring may be performed manually or by a security system or system, as described. The monitoring may include monitoring an area, a person, a weapon or all of these. Monitoring may include any type of surveillance for preventing an armed attack. Monitoring the area may include employing one or more of face recognition, weapon recognition and/or identifier recognition.

In block 704, a power controller coupled to an electromagnet can be activated to supply power to the electromagnet in the area in accordance with a trigger mechanism. The power controller may be as simple as a switch or as complex as an automated decision system, which employs multiple inputs and sensors to derive a score to determine whether to trigger the electromagnet. The trigger mechanism may trigger automatically in accordance with a detector, which detects the presence of the weapon in the area.

In block 706, magnetic force is generated in the electromagnet to attract the weapon to make continued use of the weapon difficult or impossible within the area.

Having described preferred embodiments for an electromagnetic safety device (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A safety system, comprising;

an electromagnet positioned in an area; and a trigger mechanism configured to be triggered when the area is traversed by a person with a weapon, such that, upon activation of the electromagnet, a magnetic force is generated capable of attracting materials with magnetic properties to make continued use of the weapon difficult or impossible within the area.

2. The safety system as recited in claim 1, wherein the trigger mechanism is triggered automatically in accordance with a detector, which detects a presence of the weapon in the area.

3. The safety system as recited in claim 1, wherein the trigger mechanism is triggered manually using a switch or button activated by a person.

4. The safety system as recited in claim 1, wherein the electromagnet includes an array of electromagnets positioned about the area.

5. The safety system as recited in claim 1, wherein the electromagnet is positioned within a wall, floor or ceiling in the area.

6. The safety system as recited in claim 1, wherein the electromagnet is configured to move to increase a likelihood of attracting the weapon.

7. The safety system as recited in claim 1, further comprising a grate or door disposed over the electromagnet and configured to permit the weapon to pass through the grate or door when attracted to the electromagnet to prevent access to the weapon.

8. The safety system as recited in claim 1, wherein the electromagnet is recessed below a surface of a partition such that a captured weapon cannot be fired without hitting the partition.

9. The safety system as recited in claim 1, further comprising an identification system configured to receive feedback from one or more sensors in the area to determine whether an unauthorized weapon has entered the area and to trigger activation of the electromagnet.

10. The safety system as recited in claim 9, wherein the one or more sensors includes one or more of a camera and/or a metal detector to detect a presence of the weapon in the area.

11. The safety system as recited in claim 9, wherein the identification system includes one or more of face recognition, weapon recognition and/or identifier recognition to determine whether the weapon is authorized.

12. The safety system as recited in claim 9, wherein the identification system includes a score or evaluation to determine risk potential for activating the electromagnet.

13. A method for disarming an individual, comprising:

monitoring an area to detect an individual carrying a weapon; and generating magnetic force in an electromagnet to attract the weapon to make continued use of the weapon difficult or impossible within the area.

14. The method as recited in claim 13, wherein a trigger mechanism that triggers the electromagnet is triggered automatically in accordance with a detector, which detects a presence of the weapon in the area.

15. The method as recited in claim 13, wherein monitoring the area includes employing one or more of face recognition, weapon recognition and/or identifier recognition.

16. A safety system, comprising:

a processor;

memory coupled to the processor, the memory including:

a person identifier application to determine whether a person is carrying a weapon and is authorized to do so in an area based on sensor data; and an evaluator application to determine or predict an event in the area using sensor data collected from the area and to accordingly generate an output; and a power controller activated in accordance with the output to activate at least one magnetic device.

17. The system as recited in claim 16, wherein the person identifier application includes face recognition software to recognize the person.

18. The system as recited in claim 16, wherein the person identifier application identifies a carried object to recognize the person.

19. The system as recited in claim 16, wherein the at least one magnetic device includes an electromagnet positioned in the area.

20. The system as recited in claim 16, wherein the evaluator application employs different types of sensing data, which are combined and compared to a threshold to determine or predict the event.

* * * * *